United States Patent [19]

Bartleson et al.

[11] 4,269,720

[45] May 26, 1981

[54] AMINE ANTIOXIDANT

[75] Inventors: John D. Bartleson, Franklin; John C. Wollensak, Bloomfield Hills, both of Mich.

[73] Assignee: Ethyl Corporation, Richmond, Va.

[21] Appl. No.: 42,970

[22] Filed: May 29, 1979

[51] Int. Cl.³ .......................... C08K 5/18; C10L 1/22; C10M 1/34; C10M 3/28
[52] U.S. Cl. .......................................... 252/50; 44/74; 252/56 S; 252/401; 260/45.9 QB; 564/273; 564/305; 564/433
[58] Field of Search ...................... 44/74; 252/50, 401; 260/566 R, 578, 576, 45.9 QB

[56] References Cited

U.S. PATENT DOCUMENTS

| | | | |
|---|---|---|---|
| 2,662,815 | 12/1953 | Rudel | 44/74 X |
| 3,217,040 | 11/1965 | Schmerling | 44/74 X |
| 3,923,892 | 12/1975 | Klopfer | 260/578 |

FOREIGN PATENT DOCUMENTS 2160972  7/1972  Fed. Rep. of Germany ...... 260/566 R

*Primary Examiner*—John Doll
*Attorney, Agent, or Firm*—Donald L. Johnson; John F. Sieberth; Joseph D. Odenweller

[57] ABSTRACT

Organic material such as lubricating oil is stabilized against oxidative degradation by addition of an alkyl aniline (e.g. 2,4,6-triethylaniline; 2-sec-butyl-6-ethylaniline), monoethyldiphenylamine and/or N-(2-amino-3-ethyl-α-methylbenzylidene)-2,6-diethylaniline or mixtures thereof.

7 Claims, No Drawings

AMINE ANTIOXIDANT

BACKGROUND OF THE INVENTION

Aromatic amines such as N-phenyl-α-naphthylamine and diphenylamine have been used as antioxidants.

SUMMARY

According to the present invention stabilized organic compositions are provided which contain a poly-alkyl aniline, a monoethyldiphenylamine and/or N-(2-amino-3-ethyl-α-methylbenzylidene)-2,6-diethylaniline. The latter compound is a new compound.

DESCRIPTION OF THE PREFERRED EMBODIMENTS

A preferred embodiment of the invention is an organic material normally susceptible to degradation in the presence of oxygen containing an antioxidant amount of an aromatic amine selected from the group consisting of (a) compounds having the structure

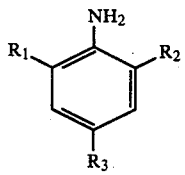

wherein $R_1$ and $R_2$ are selected from the group consisting of ethyl and butyl and $R_3$ is selected from the group consisting of hydrogen, ethyl and butyl, (b) monoethyldiphenylamine, and
(c) N-(2-amino-3-ethyl-α-methylbenzylidene)-2,6-diethylaniline and mixtures thereof.

The components (a), (b) and (c) may be present as the sole antioxidant or may be used in mixtures such as mixtures of (a+b), (a+c), (b+c), or (a+b+c). Other antioxidants may also be present in the composition.

Representative examples of compound (a) are:
2,4,6-diethylaniline
2-sec-butyl-6-ethylaniline
2,6-diethyl-4-sec-butylaniline
2,4-diethyl-6-sec-butylaniline
and the like.

Compound (b) can be any of the several positional isomers of monoethyldiphenylamine. Examples of these are:
N-(2-ethylphenyl)aniline
N-(3-ethylphenyl)aniline
N-(4-ethylphenyl)aniline The compound N-(2-amino-3-ethyl-α-methylbenzylidene)-2,6-diethylaniline has the structure

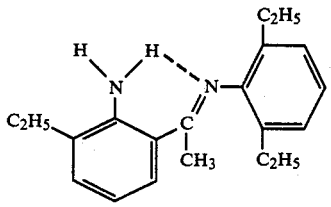

The compounds can be prepared by known methods. A preferred manner of obtaining the antioxidant compounds is to conduct an alkylation reaction whereby aniline is reacted with ethylene according to the procedure set forth in Klopfer, U.S. Pat. No. 3,923,892, incorporated herein by reference. In summary, aniline is placed in an autoclave under nitrogen and diethyl aluminum chloride is added to it to give an aniline:aluminum mole ratio of about 7-25:1. The autoclave is sealed and heated to about 100°-150° C. to form the catalyst. The autoclave is carefully vented, then sealed and heated to about 200°-300° C. and pressurized with ethylene to about 500-2000 psig. It is maintained under ethylene pressure at about 200°-400° C. until 2,6-diethylaniline production is optimized. This takes about 2-8 hours.

Following the alkylation the reaction mixture is washed with aqueous caustic to remove the catalyst. Unreacted aniline, 2-ethylaniline and 2,6-diethylaniline are distilled off leaving a residual product. This residual product consists mainly of

| | |
|---|---|
| 2,4,6-triethylaniline | 5-20 wt % |
| diethyl-sec-butylaniline (2 isomers) | 1-10 wt % |
| 2-sec-butyl-6-ethylaniline | 20-40 wt % |
| diphenylamine | 1-10 wt % |
| monoethyldiphenylamine (2 isomers) | 10-20 wt % |
| N-(2-amino-3-ethyl-α-methylbenzylidene)-2,6-diethylaniline | 15-35 wt % |

The product is preferably used in this form as an antioxidant. Optionally the components may be separated by methods such as fractionation, chromatography and the like to obtain the individual compounds or fractions that are enriched in the individual compounds.

The following example illustrates the preferred manner of obtaining the antioxidant compounds.

EXAMPLE 1

In an autoclave place 200 gms of aniline. Flush with nitrogen and heat to about 90° C. and add 15 gms of diethyl aluminum chloride. Seal and stir about 5 minutes. Vent the autoclave to atmospheric pressure. Seal and heat to about 275° C. and continue stirring while pressurizing to about 1000 psig eith ethylene. Continue ethylene feed to maintain about 1000 psig at about 320° C. After 3 hours cool and vent the autoclave. Wash the reaction product with aqueous caustic to remove catalyst. Transfer the product to a distillation vessel and distill to remove first aniline, next o-ethylaniline and then 2,6-diethylaniline. Bottoms temperature reaches about 290° C. during this distillation. Cool the residual material to obtain an oily product analyzing

| | |
|---|---|
| 2,4,6-triethylaniline | 10.1% |
| diethyl-sec-butylaniline | 3.6%[1] |
| 2-sec-butyl-6-ethylaniline | 22.1% |
| diphenylamine | 5.1% |
| monoethyldiphenylamine | 16.3%[2] |
| N-(2-amino-3-ethyl-α-methylbenzylidene)-2,6-diethylaniline | 28.3% |

[1] 2 isomers
[2] 2 isomers

This mixture can be used as such as an antioxidant since it has excellent antioxidant properties. Optionally, it may be fractionated into its separate components. Such a residual product was distilled under vacuum giving the following main fractions:

| | Appx. Boiling Pt. | mm Hg Abs. |
|---|---|---|
| 2,4,6-triethylaniline | 150° C. | 20 |
| 2-sec-butyl-6-ethylaniline | 150° C. | 20 |
| diethyl-sec-butylaniline | 155° C. | 10 |
| diphenylamine[1] | 160° C. | 1.5 |
| monoethyldiphenylamine | 184° C. | 1.5 |
| N-(2-amino-3-ethyl-α-methylbenzylidene)-2,6-diethylaniline | 172° C. | 0.5 |

[1]diphenylamine is a known antioxidant and its use other than in the present combinations is not part of this invention The antioxidant can be used in a broad range of organic material normally subject to gradual degradation in the presence of oxygen during use over an extended period. In other words, the organic compositions protected by the present antioxidants are the type in which the art recognizes the need for antioxidant protection and to which an antioxidant of some type is customarily added to obtain an extended service life. The oxidative degradation protected against is the slow gradual deterioration of the organic composition rather than, for example, combustion. In other words, the present additives are not flame retarding additives nor flame suppressing additives and the degradation protected against is not combustion but, rather, the gradual deterioration of the organic composition due to the effects of oxygen over an extended period of time.

Examples of organic materials in which the additives are useful include polymers, both homopolymers and copolymers, of olefinically unsaturated monomers, for example, polyolefins such as polyethylene, polypropylene, polybutadiene, and the like. Also, poly-halohydrocarbons such as polyvinyl chloride, polychloroprene, polyvinylidene chloride, polyfluoro olefins, and the like, are afforded stabilization. The additives provide antioxidant protection in natural and synthetic rubbers such as copolymers of olefinically unsaturated monomers including styrene-butadiene rubber (SBR rubber), ethylenepropylene copolymers, ethylene-propylenediene terpolymers such as the terpolymer of ethylene, propylene and cyclopentadiene or 1,4-cyclooctadiene. Polybutadiene rubbers such as cis-polybutadiene rubber are protected. Poly-2-chloro-1,3-butadiene (neoprene) and poly-2-methyl-1,3-butadiene (isoprene rubber) are stabilized by the present additives. Likewise, acrylonitrile-butadiene-styrene (ABS) resins are effectively stabilized. Ethylenevinyl acetate copolymers are protected, as are butene-methylacrylate copolymers. Nitrogen-containing polymers such as polyurethanes, nitrile rubber, and lauryl acrylate-vinyl-pyrrolidone copolymers are effectively stabilized. Adhesive compositions such as solutions of polychloroprene (neoprene) in toluene are protected.

Petroleum oils such as solvent-refined, midcontinent lubricating oil and Gulfcoast lubricating oils are effectively stabilized. In hydrocarbon lubricating oils, both mineral and synthetic, the present additives are particularly effective when used in combination with a zinc dihydrocarbyldithiophosphate, e.g. zinc dialkyldithiophosphate or zinc di-alkaryldithiophosphate.

Synthetic ester lubricants such as those used in turbines and turbojet engines are given a high degree of stabilization. Typical synthetic ester lubricants include di-2-ethylhexyl sebacate, trimethylolpropane tripelargonate, $C_{5-9}$ aliphatic monocarboxylic esters of pentaerythritol, complex esters formed by condensing under esterifying conditions, mixtures of polyols, polycarboxylic acids, and aliphatic monocarboxylic acids and/or monohydric alkanols. An example of these complex esters is the condensation product formed from adipic acid, ethyleneglycol and a mixture of $C_{5-9}$ aliphatic monocarboxylic acids. Plasticizers such as dioctyl phthalate are effectively protected. Heavy petroleum fractions such as tar and asphalt can also be protected should the need arise.

Polyamides such as adipic acid-1,6-diaminohexane condensates and poly-6-aminohexanoic acid (nylon) are effectively stabilized. Polyalkylene oxides such as copolymers of phenol with ethylene oxide or propylene oxide are stabilized. Polyphenyl ethers such as poly-2,6-dimethylphenyl ether formed by polymerization of 2,6-dimethylphenol using a copper-pyridine catalyst are stabilized. Polycarbonate plastics and other polyformaldehydes are also protected.

Linear polyesters such as phthalic anhydride-glycol condensates are given a high degree of protection. Other polyesters such as trimellitic acid-glycerol condensates are also protected. Polyacrylates such as polymethylacrylate and polymethylmethacrylate are effectively stabilized. Polyacrylonitriles and copolymers of acrylonitriles with other olefinically unsaturated monomers such as methylmethacrylates are also effectively stabilized.

The additives can be used to protect any of the many organic substrates to which an antioxidant is normally added. It can be used where economics permit to protect such substrates as asphalt, paper, fluorocarbons such as teflon, polyvinyl acetate, polyvinylidene chloride, coumarone-indene resins, polyvinyl ethers, polyvinylidene bromide, polyvinyl bromide, acrylonitrile, vinyl bromide copolymer, vinyl butyral resins, silicones such as dimethylsilicone lubricants, phosphate lubricants such as tricresylphosphate, and the like.

The additives are incorporated into the organic substrate in a small but effective amount so as to provide the required antioxidant protection. A useful range is from about 0.005 to about 10 weight percent, and a preferred range is from about 0.05 to 5 weight percent.

Methods of incorporating the additive into the substrate are well known. For example, if the substrate is liquid the additive can be merely mixed into the substrate. Frequently the organic substrate is in solution and the additive is added to the solution and the solvent removed. Solid organic substrates can be merely sprayed with a solution of the additive in a volatile solvent. For example, stabilized grain products result from spraying the grain with a toluene solution of the additive. In the case of rubbery polymers the additive can be added following the polymerization stage by mixing it with the final emulsion or solution polymerization mixture and then coagulating or removing solvent to recover the stabilized polymer. It can also be added at the compounding stage by merely mixing the additive with the rubbery polymer in commercial mixing equipment such as a Banbury blender. In this manner, rubbery polymers such as styrene-butadiene rubber, cis-polybutadiene or isoprene polymers are blended with the antioxidant together with the other ingredients normally added such as carbon black, oil, sulfur, zinc oxide, stearic acid, vulcanization accelerators, and the like. Following mastication, the resultant mixture is fabricated and molded into a finished form and vulcanized. The following will serve to illustrate the manner in which the additives are blended with various organic substrates.

EXAMPLE 2

To a synthetic rubber master batch comprising 100 parts of SBR rubber having an average molecular weight of 60,000, 50 parts of mixed zinc propionate stearate, 50 parts carbon black, 5 parts road tar, 2 parts sulfur and 1.5 parts of mercapto benzothiazole is added 1.5 parts of the residual product from Example 1. After mastication, the resultant master batch is cured for 60 minutes using 45 psi steam pressure, resulting in a stabilized SBR vulcanizate.

EXAMPLE 3

A cis-polybutadiene polymer is prepared having 90 percent cis configuration by polymerizing butadiene in a toluene solvent employing a diethyl aluminum chloride-cobalt iodide catalyst. Following the polymerization, a small amount sufficient to provide 0.2 weight percent of N-(2-amino-3-ethyl-α-methylbenzylidene)-2,6-diethylaniline is added to the toluene solution, following which the solution is injected into boiling water together with steam causing the solvent to distill out and the cis-polybutadiene to coagulate, forming a rubber crumb. The crumb is dried and compressed into bales, resulting in a stabilized cis-polybutadiene.

EXAMPLE 4

To 100,000 parts of a blend of 15 weight percent decene-1 trimers and tetramers (4.1 cs 100° C.) and 85 weight percent 150 SUS neutral mineral oil is added 500 parts of the residual product mixture from Example 1. Following this is added 100 parts of a zinc dialkyldithiophosphate, 50 parts of an overbased calcium alkaryl sulfonate, 1,000 parts of a polydodecylmethacrylate V.I. improver and 2,000 parts of a 70 percent active oil solution of an alkenyl succinimide of tetraethylenepentamine in which the alkenyl group has a molecular weight of 950. The resultant mixture is blended while warm, following which it is filtered and packaged, giving a stable, partial synthetic lubricating oil useful in automotive engines.

EXAMPLE 5

To 10,000 parts of trimethylolpropane tripelargonate is added 200 parts of tricresylphosphate, 10 parts of dimethyl silicone, 10 parts of benzothiazole, 50 parts 2,4,6-triethylaniline resulting in a stabilized synthetic ester lubricant.

EXAMPLE 6

To 1,000 parts of polyethylene is added 3 parts of 2-sec-butyl-6-ethylaniline. The mixture is heated to its melting point and stirred and then passed through an extruder having a central mandrel to form tubular polyethylene which is inflated to form a useful polyethylene film.

Tests were conducted which show the antioxidant effectiveness of the present additives. In these tests mineral oil containing 50 ppm iron as ferric naphthenate and test additive was placed in a test cell. It was maintained at 150° C. and air was bubbled through it for 24 hours at the rate of 8 liters per hour. The amount of oxidative degradation was determined by measuring increase in viscosity and acid number. The following results were obtained in a 300 SUS mineral oil. The several values under each test are replicates.

| Additive | Conc % | Vis. Increase | | Acid No. | |
|---|---|---|---|---|---|
| none | — | 430, 430, | 448 503 | 12.3, 10.5, | 12.2 12.1 |
| aromatic amine mixture from Example 1 | 0.5 | 54, | 63 | 5.3, | 5.1 |
| aromatic amine mixture from Example 1 | 1.0 | 10, | 12 | 0.5, | 0.7 |
| "DEA dimer"[1] | 0.5 | 54, | 54 | 4.7, | 3.6 |
| " | 1.0 | 25, | 25 | 1.7, | 1.8 |

[1]N-(2-amino-3-ethyl-α-methylbenzylidene)-2,6-diethylaniline

The same test was conducted with 150 SUS mineral oil.
The following results were obtained:

| Additive | Conc % | % Vis. Increase | | Acid No. | |
|---|---|---|---|---|---|
| none | — | 268, | 330 | 9.7, | 10.5 |
| aromatic amine mixture from Example 1 | 0.5 | 9, | 6 | 0.4, | 0.5 |
| "DEA dimer" | 0.5 | 15, | 23 | 0.5, | 2.0 |

The above results show the antioxidant effectiveness of the present additives.

We claim:
1. Organic material normally susceptible to gradual degradation in the presence of oxygen during use over an extended period containing an antioxidant amount of N-(2-amino-3-ethyl-α-methylbenzylidene)-2,6-diethylaniline.
2. A composition of claim 1 wherein said organic material is selected from lubricating oils and liquid hydrocarbon fuels.
3. A composition of claim 2 wherein said organic material is a hydrocarbon lubricating oil.
4. An organic composition of claim 1 further characterized by containing an additive having the structure

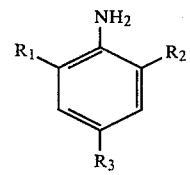

wherein $R_1$ and $R_2$ are selected from the group consisting of ethyl and butyl and $R_3$ is selected from the group consisting of hydrogen, ethyl and butyl.
5. An organic composition of claim 4 wherein said additive is a mixture of compounds containing 2,4,6-triethylaniline, diethyl-sec-butylaniline and 2-sec-butyl-6-ethylaniline.
6. An organic composition of claim 5 further characterized by containing an antioxidant amount of monoethyldiphenylamine.
7. Hydrocarbon lubricating oil containing an antioxidant amount of a mixture of 2,4,6-triethylaniline, diethyl-sec-butylaniline, 2-sec-butyl-6-ethylaniline, monoethyldiphenylamine and N-(2-amino-3-ethyl-α-methylbenzylidene)-2,6-diethylaniline.

* * * * *

UNITED STATES PATENT AND TRADEMARK OFFICE
CERTIFICATE OF CORRECTION

PATENT NO. : 4,269,720
DATED : May 26, 1981
INVENTOR(S) : John D. Bartleson et al It is certified that error appears in the above-identified patent and that said Letters Patent are hereby corrected as shown below:

Column 1, line 46 - "diethylaniline" should be
-- triethylaniline --

Column 6, line 6 - heading - before "Vis." insert
-- % --

Signed and Sealed this

First Day of September 1981

[SEAL]

Attest:

GERALD J. MOSSINGHOFF

Attesting Officer       Commissioner of Patents and Trademarks